United States Patent
Fan et al.

(10) Patent No.: US 9,454,725 B2
(45) Date of Patent: Sep. 27, 2016

(54) PASSAGE JUSTIFICATION SCORING FOR QUESTION ANSWERING

(71) Applicant: International Business Machines Corporation, Armonk, NY (US)

(72) Inventors: James J. Fan, Mountain Lakes, NJ (US); Chang Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/656,990

(22) Filed: Mar. 13, 2015

(65) Prior Publication Data

US 2016/0232443 A1    Aug. 11, 2016

Related U.S. Application Data

(63) Continuation of application No. 14/614,453, filed on Feb. 5, 2015.

(51) Int. Cl.
  G06N 3/08    (2006.01)
  G06N 3/04    (2006.01)
  G06F 17/00   (2006.01)

(52) U.S. Cl.
  CPC . *G06N 3/08* (2013.01); *G06N 3/04* (2013.01)

(58) Field of Classification Search
  None
  See application file for complete search history.

(56) References Cited

U.S. PATENT DOCUMENTS

| | | | | |
|---|---|---|---|---|
| 2009/0287678 A1* | 11/2009 | Brown | ............... | G06F 17/30654 |
| 2011/0270815 A1* | 11/2011 | Li | ........................ | G06F 17/3043 707/706 |
| 2014/0229407 A1* | 8/2014 | White | ................... | G06N 99/005 706/12 |
| 2014/0236578 A1* | 8/2014 | Malon | ...................... | G06F 17/28 704/9 |
| 2014/0310218 A1* | 10/2014 | Min | ......................... | G06N 3/08 706/16 |
| 2015/0178623 A1* | 6/2015 | Balani | ..................... | G06N 5/025 706/48 |

OTHER PUBLICATIONS

Furbach et al, An Application of Automated Reasoning in Natural Language Question Answering, 2011.*
Irsoy et al, Deep Recursive Neural Networks for Compositionality in Language, 2014.*
Kalchbrenner et al, Recurrent Convolutional Neural Networks for Discourse Compatibility, 2013.*

(Continued)

*Primary Examiner* — Stanley K Hill
*Assistant Examiner* — Mikayla Chubb
(74) *Attorney, Agent, or Firm* — Cantor Colburn LLP; William J. Stock

(57) ABSTRACT

According to an aspect, passage justification scoring includes creating a multi-layered neural network from domain knowledge and training the multi-layered neural network with labeled data and unlabeled data. A further aspect includes inputting at least one of an existing passage justification component and raw input data for a question and passage to the multi-layered neural network, extracting concepts determined to have passage justification with respect to a candidate answer contained in a respective passage, and creating a passage justification model from the extracted concepts and from passage justification ground truth.

9 Claims, 6 Drawing Sheets

(56) References Cited

OTHER PUBLICATIONS

Magnini et al, Is It the Right Answer? Exploiting Web Redundancy for Answer Validation, 2002.*

Yangarber et al, Unsupervised Discovery of Scenario-Level Patterns for Information Extraction, 2000.*

James J. Fan et al., Pending U.S. Appl. No. 14/614,453 entitled "Passage Justification Scoring for Question Answering," filed with the U.S. Patent and Tradmark Office on Feb. 5, 2015.

James J. Fan et al., Pending U.S. Appl. No. 14/614,449 entitled "Scoring Type Coercion for Question Answering," filed with the U.S. Patent and Tradmark Office on Feb. 5, 2015.

James J. Fan et al., Pending U.S. Appl. No. 14/657,008 entitled "Scoring Type Coercion for Question Answering," filed with the U.S. Patent and Tradmark Office on Mar. 13, 2015.

List of IBM Patents or Patent Applictions Treated as Related; (Appendix P), Filed Mar. 13, 2015, 2 pages.

* cited by examiner

PASSAGE JUSTIFICATION SCORING FOR QUESTION ANSWERING

DOMESTIC PRIORITY

This application is a continuation of U.S. patent application Ser. No. 14/614,453, filed Feb. 5, 2015, the content of which is incorporated by reference herein in its entirety.

BACKGROUND

The present disclosure relates generally to question answering, and more specifically, to passage justification scoring for question answering.

Question answering (QA) is a type of information retrieval. Given a collection of documents, a system employing question answering attempts to retrieve answers to questions posed in natural language. Question answering is regarded as requiring more complex natural language processing (NLP) techniques than other types of information retrieval, such as document retrieval.

Passage justification is a popular validation component in the field of question answering. Passage justification methodologies seek to determine if a text passage justifies a candidate answer as being the correct answer to a question. Known solutions for passage justification typically require a large amount of labeled training data.

SUMMARY

Embodiments include a method for passage justification scoring for question answering. The method includes creating a multi-layered neural network from domain knowledge and training the multi-layered neural network with training data. The method further includes inputting at least one of an existing passage justification component and raw input data for a question and passage to the multi-layered neural network, extracting concepts determined to have passage justification with respect to a candidate answer contained in a respective passage, and creating a passage justification model from the extracted concepts and from passage justification ground truth.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein can be utilized for passage justification scoring in a question answering (QA) system. The embodiments described herein provide passage justification scoring for a passage with respect to a question using neural networks, such that less labeled training data is required. Neural networks, such as one or more convolutional neural networks and deep neural networks may be constructed from domain knowledge and trained using a relatively small amount of labeled training data along with a larger amount of unlabeled data. Once trained, a number of features may be generated using known passage justification components and/or raw data from the question and/or passage, which features are used as input into the multi-layered neural network. Output from lower-level networks may be used as concepts for input into higher-level networks to obtain higher level concepts. The concepts extracted from the neural networks may be used to construct passage justification models by applying machine learning techniques.

As used herein, the term "concept" refers to an abstract idea or general notion that can be specified using a collection of names or labels, and a corresponding description. Additionally, sample sentences describing the concept may be included in the description of the concept. Concepts, such as, for example, "To be or not to be," "singular value decomposition," or "New York Yankees" may be encoded in a web page (e.g., Wikipedia).

As used herein the term "query" refers to a request for information from a data source. A query can typically be formed by specifying a concept or a set of concepts in a user interface directly or indirectly by stating a query in natural language from which concepts are then extracted. The term "query" and "question" are used interchangeably herein.

Figure 1:
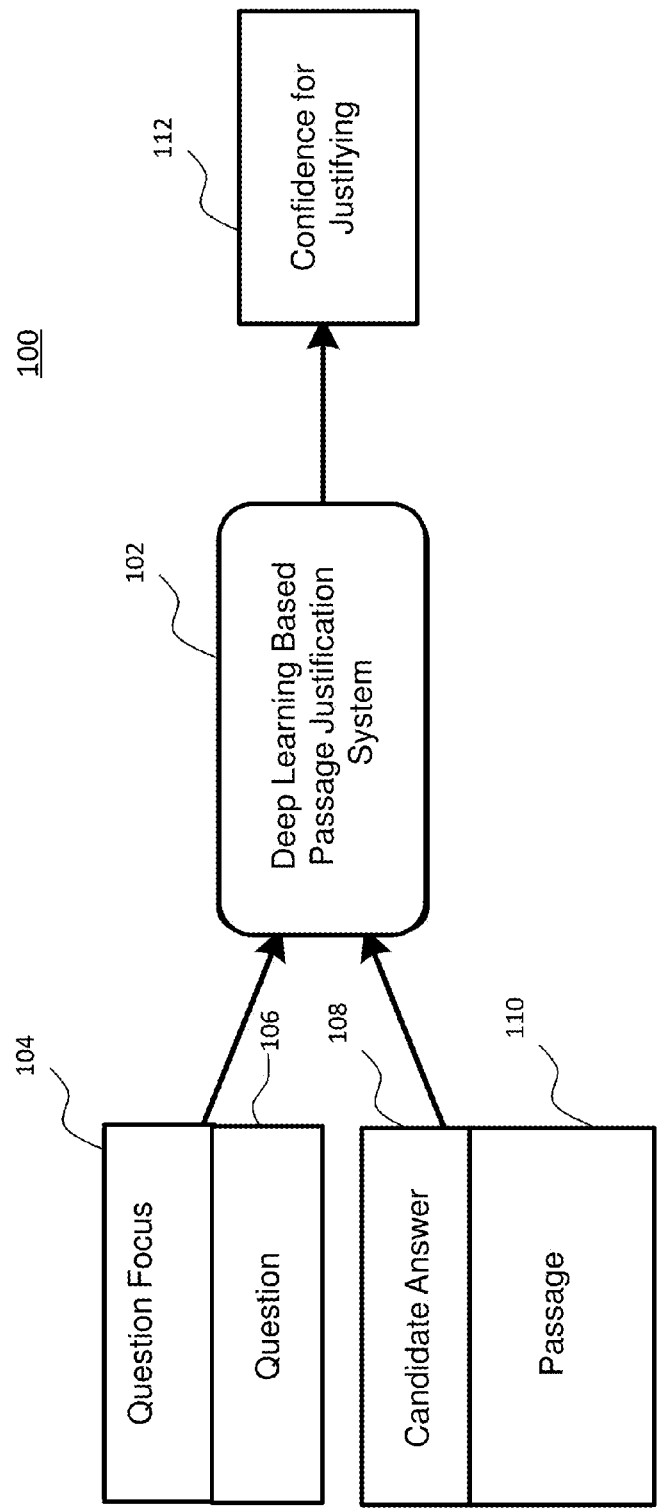
FIG. 1 depicts a high level view of a system for passage justification scoring in accordance with an embodiment.

Referring now to FIG. 1, a high level view of a system 100 for passage justification scoring is generally shown in accordance with an embodiment. As shown in the embodiment of FIG. 1, a deep learning based passage justification component 102 receives a question focus 104 and a question 106 from which the question focus 104 is derived. The question focus 104 indicates some property or entity sought by the question. The deep learning based passage justification component 102 also receives a candidate answer 108 and associated passage 110 from which the candidate answer 108 is generated. The deep learning based passage justification component 102 processes these inputs and generates a confidence score for passage justification 112.

Figure 2:
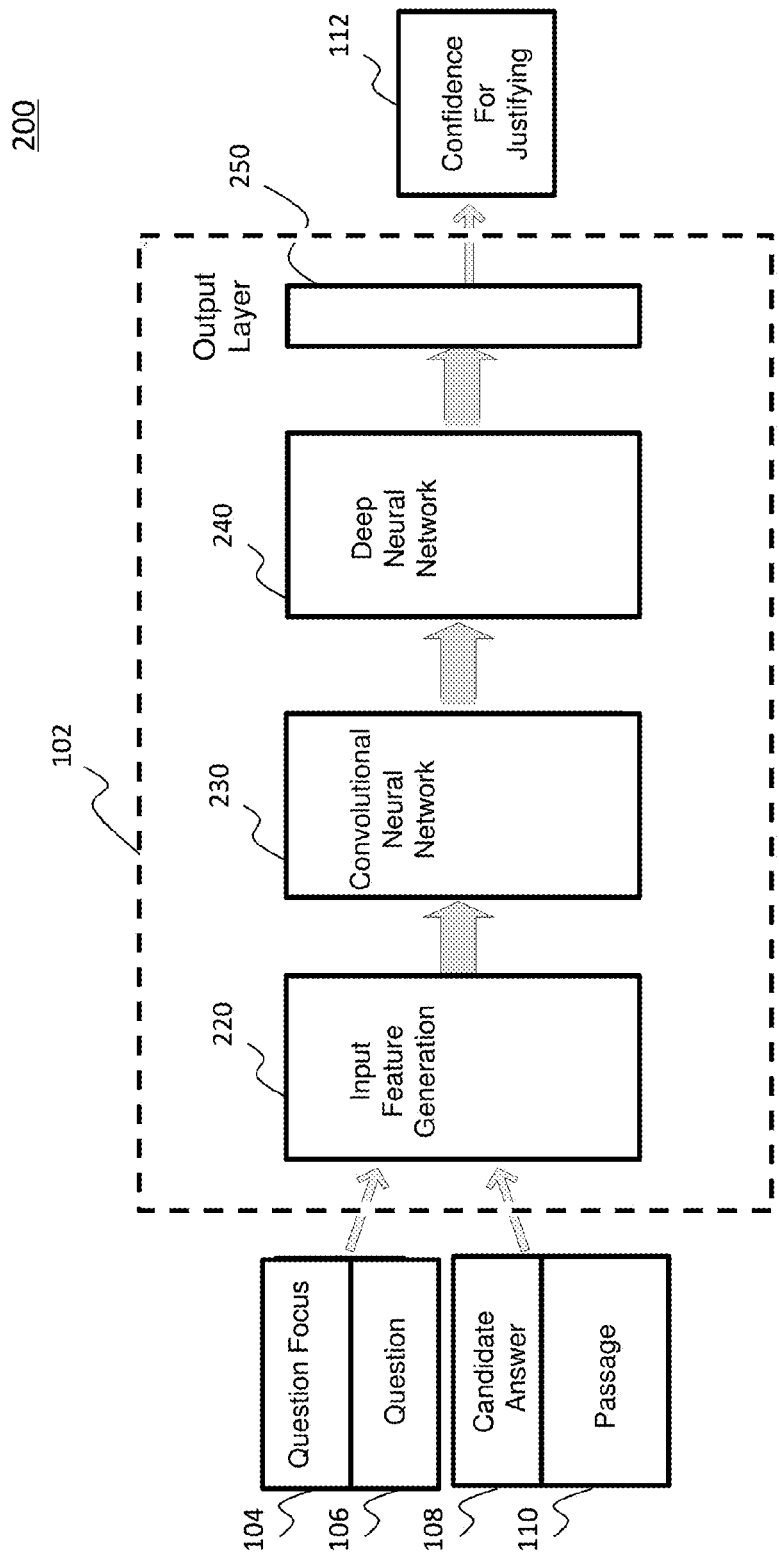
FIG. 2 depicts a detailed view of the system of FIG. 1 in accordance with an embodiment.

A detailed view of one embodiment of the system of FIG. 1 will now be described with respect to FIG. 2. The system 200 of FIG. 2 corresponds to the system 100 of FIG. 1. As shown in FIG. 2, the deep learning based passage justification component 102 includes an input generation feature 220, a convolutional neural network 230, a deep neural network 240, and a learning component 250 including concepts extracted from the networks 230 and 240.

Figure 3B:
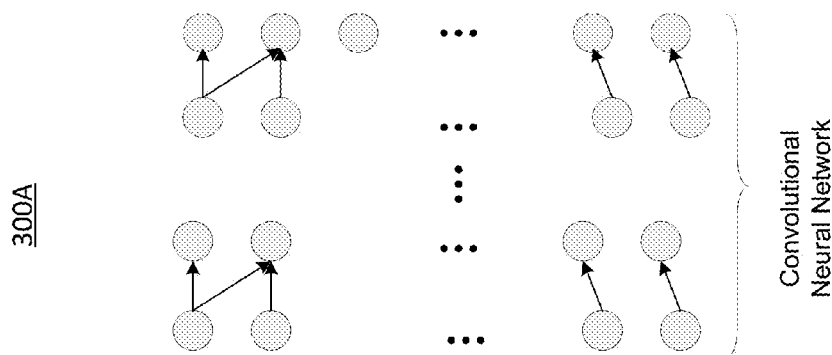
FIG. 3B depicts a sample deep neural network in accordance with an embodiment.
Figure 3A:
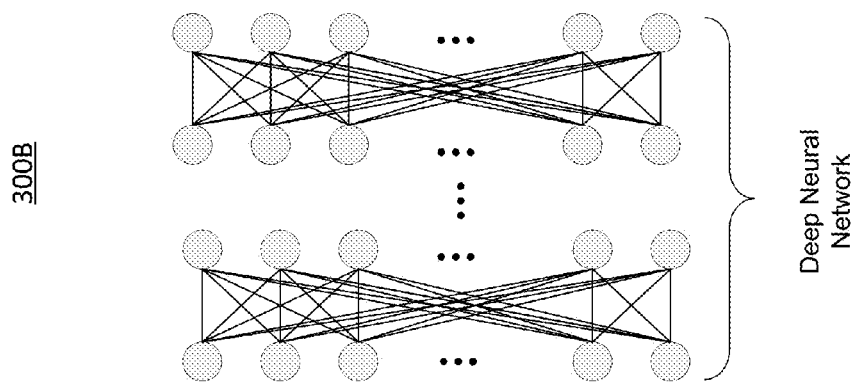
FIG. 3A depicts a sample convolutional neural network in accordance with an embodiment.

A sample convolutional neural network (CNN) 300A is shown in FIG. 3A, and a sample deep neural network (DNN)

300B is shown in FIG. 3B. The convolutional neural network 300A includes a network of nodes and relations between the nodes that are depicted as edges. The deep neural network 300B includes a network of nodes and node relationships that are depicted as edges. The nodes in FIGS. 3A-3B may represent features.

It will be understood by one skilled in the art that variations on the components of FIG. 2 may be provided. For example, the deep learning based passage justification component 102 may include the convolutional neural network 230 without the deep neural network 240. Likewise, the deep neural network 240 may be utilized in the deep learning based passage justification component 102 absent the convolutional neural network 230. Alternatively, the deep learning based passage justification component 102 may include multiple convolutional neural networks 230 and deep neural networks 240 stacked upon one another, such as CNN-DNN- . . . -CNN or CNN-DNN- . . . -CNN-DNN.

The neural network(s) 230 and/or 240 may be created from domain knowledge and trained by learning component 250 to produce a number of features which can be used as input to a trained, multi-layered neural network, as described further herein.

The input feature generation component 220 generates input features used in implementing the multi-layered neural network. Based on the nature of application, the input features may be derived from existing passage justification components and/or from raw features from input data. Non-limiting examples of existing passage justification components may include focus-answer type matching features (e.g., type coercion features), question-passage term matching features (e.g., passage-term-match features), and question-passage parse matching features (e.g., parse distance features). Other non-limiting examples of existing passage justification components may include question-passage dependency path matching features, question-passage relation matching features, and question-passage topic matching features (e.g., LSA features).

In addition, non-limiting examples of raw features from input data may include bag of words features for the question, bag of words features for the passage, typing features for the question, and typing features for the passage. Other non-limiting examples of raw features from input data include topic features for the question, topic features for the passage, Ngram features for the question, and Ngram features for the passage.

Figure 4:
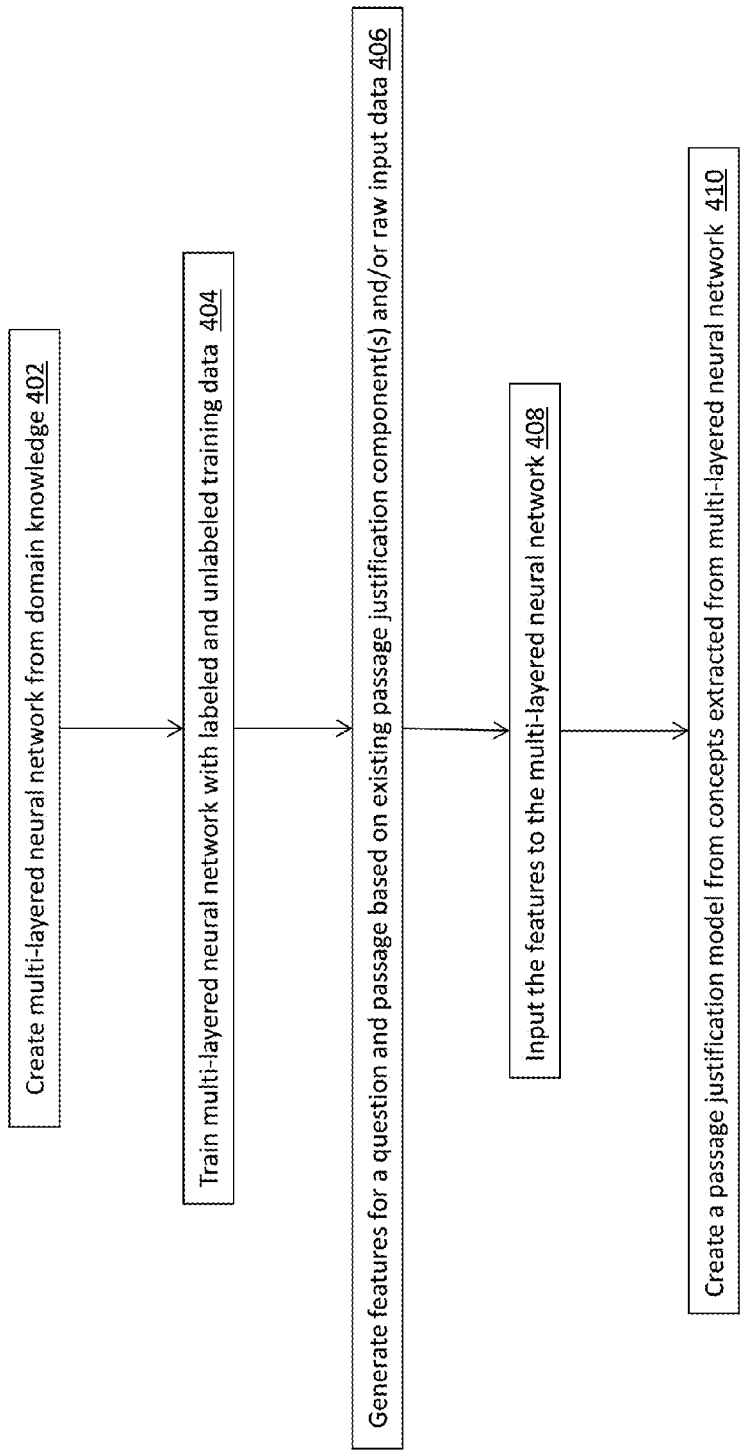
FIG. 4 depicts a flow diagram of a process for passage justification scoring in accordance with an embodiment.

Turning now to FIG. 4, a process for passage justification scoring will now be described in an embodiment.

At block 402, a multi-layered neural network (e.g., one or more of networks 230 and 240) are created from domain knowledge.

At block 404, the multi-layered neural network is trained using a mix of labeled data and unlabeled data. The mix contains proportionally greater amounts of unlabeled data than labeled data as the training data for the network. For example, positive data includes passages that contain the correct answer to justify the question, and negative data includes any passage that does not contain the correct answer and cannot justify the question. The labeled data and the unlabeled data may be generated using full supervision techniques with manually annotated data. Training the multi-layered neural network may include using the labeled data with the multi-layered neural network to force the output of the network to match corresponding labels of the labeled data. Training the network may also, or alternatively, include using the unlabeled data with the network to minimize data reconstruction errors At block 406, the feature generation component 220 generates features from raw data from the information source and/or from existing passage justification components. The features may include the passage justification scores produced by existing passage justification components, and/or the raw features representing the input question, the question focus, the input passage, and the candidate answer contained in the input passage.

The features are grouped based on their functions in the question answering task. For example, related typing features may be grouped together. Other examples include relations associating parse matching features, term matching features, syntactic matching features, topic features, and bag of words features, to name a few. At block 408, the features are input to the trained multi-layered neural network. In an embodiment, concepts are output by a lower level or layer of the multi-layered neural network, and these concepts are then input to a higher layer of the multi-layered neural network. The output of any of the layers of the multi-layered neural network can be used to create a passage justification model that scores the corresponding passage as justification for a candidate answer (contained in the passage) as being the correct answer for a given question.

Figure 5:
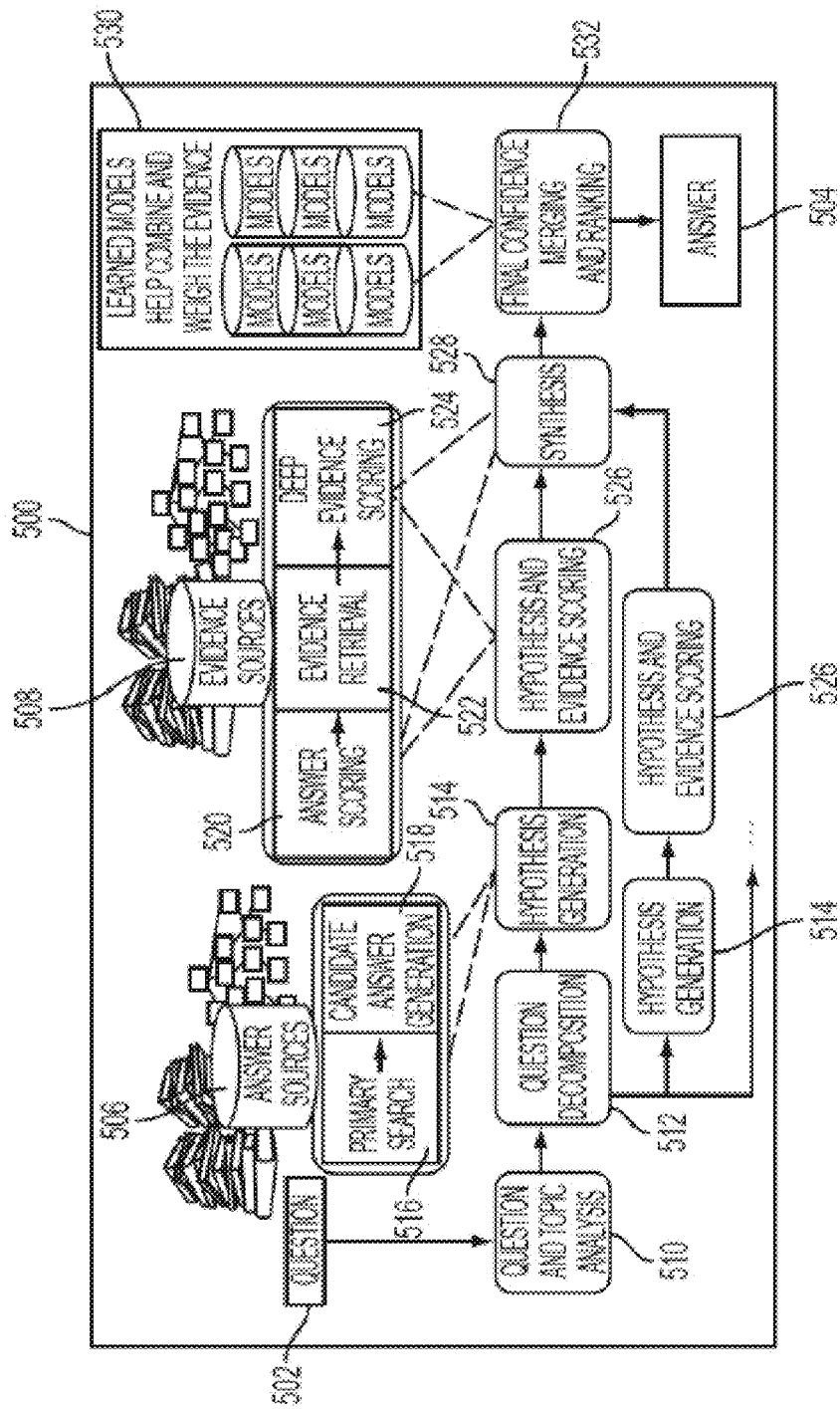
FIG. 5 depicts a high-level block diagram of a question answering (QA) framework where embodiments of passage justification scoring can be implemented in accordance with an embodiment.

Turning now to FIG. 5, a high-level block diagram of a question answering (QA) framework 500 where embodiments described herein can be utilized is generally shown. The QA framework 500 can be implemented on the deep learning-based passage justification system 102 of FIG. 1.

The QA framework 500 can be implemented to generate an answer 504 (and a confidence level associated with each answer) to a given question 502. In an embodiment, general principles implemented by the framework 500 to generate answers 504 to questions 502 include massive parallelism, the use of many experts, pervasive confidence estimation, and the integration of shallow and deep knowledge. In an embodiment, the QA framework 500 shown in FIG. 5 is implemented by the Watson™ product from IBM.

The QA framework 500 shown in FIG. 5 defines various stages of analysis in a processing pipeline. In an embodiment, each stage admits multiple implementations that can produce alternative results. At each stage, alternatives can be independently pursued as part of a massively parallel computation. Embodiments of the framework 500 don't assume that any component perfectly understands the question 502 and can just look up the right answer 504 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 5, the question and topic analysis 510 is performed and used in question decomposition 512. Hypotheses are generated by the hypothesis generation block 514 which uses input from the question decomposition 512, as well as data obtained via a primary search 516 through the answer sources 506 and candidate answer generation 518 to generate several hypotheses. Hypothesis and evidence scoring 526 is then performed for each hypothesis using evidence sources 508 and can include answer scoring 520, evidence retrieval 522 and deep evidence scoring 524.

A synthesis 528 is performed of the results of the multiple hypothesis and evidence scorings 526. Input to the synthesis 528 can include answer scoring 520, evidence retrieval 522, and deep evidence scoring 524. Learned models 530 can then be applied to the results of the synthesis 528 to generate a final confidence merging and ranking 532. A ranked list of answers 504 (and a confidence level associated with each answer) is then output.

The QA framework 500 shown in FIG. 5 can utilize embodiments of the deep learning-based passage justification scoring system 102 in combination with sources of information (e.g., answer sources 506, question 502, and candidate answer generation 518) that include raw features from input data, as well as existing passage justification components to create a learned model (deep learning model), which is part of 524, and implemented as a multi-layered neural network. The multi-layered neural network generates concepts through lower level layers that are then input to higher level layers to generate higher level concepts. Extracted concepts from the deep learning model are scored.

Figure 6:
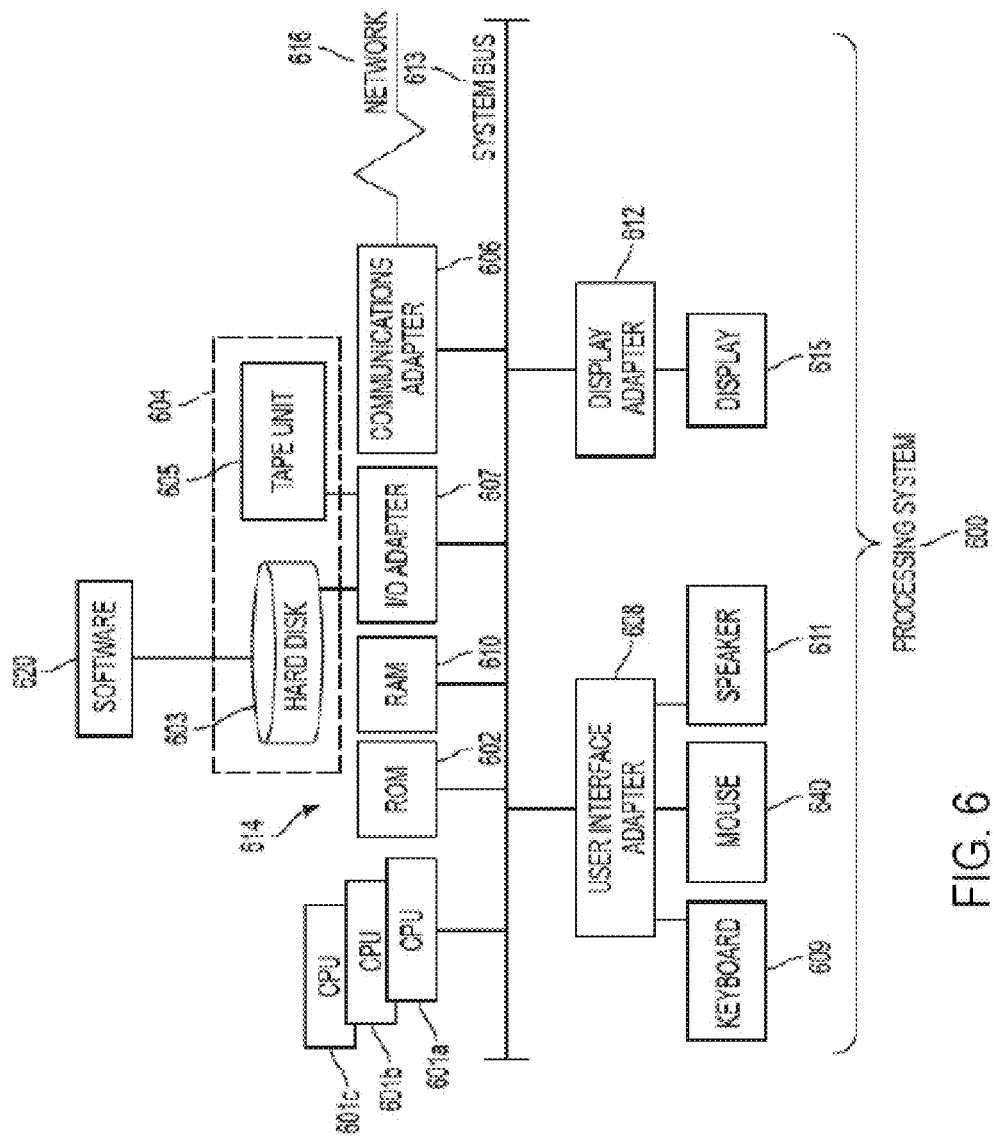
FIG. 6 depicts a processing system for passage justification scoring in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as instructions for execution by the processors 601 to perform a method, such as the process flow of FIG. 4. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system to coordinate the functions of the various components shown in FIG. 6.

Technical effects and benefits include the capability to perform passage justification scoring in a question answering system using neural networks, such that less labeled training data is required. Neural networks, such as one or more convolutional neural networks and deep neural networks are constructed from domain knowledge and trained using a relatively small amount of labeled training data long with a larger amount of unlabeled data. Once trained, a number of features may be generated using known passage justification components and/or raw input data and used as input into the multi-layered neural network. The output from lower-level networks may be used as concepts for input into the higher-level networks to obtain higher level concepts. The concepts extracted from the neural networks may be used to construct passage justification models by applying machine learning techniques.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    creating a multi-layered neural network from domain knowledge;
    training the multi-layered neural network with labeled data and unlabeled data;
    inputting at least one of an existing passage justification component and raw input data for a question and passage to the trained multi-layered neural network;
    extracting, via the trained multi-layered neural network and from results of inputting the at least one existing passage justification component and raw input data for a question and passage, concepts determined to have passage justification;
    creating, via machine learning, a passage justification model from the extracted concepts and from passage justification; and
    scoring, via the passage justification model, the extracted concepts.

2. The method of claim 1, wherein the existing passage justification components include at least one of:
    focus-answer type matching features;
    question-passage term matching features;
    question-passage parse matching features;
    question-passage dependency path matching features;
    question-passage relation matching features; and
    question-passage topic matching features.

3. The method of claim 1, wherein the raw input data include at least one of:
- bag of words features for the question;
- bag of words features for the passage;
- typing features for the question;
- typing features for the passage;
- topic features for the question;
- topic features for the passage;
- Ngram features for the question; and
- Ngram features for the passage.

4. The method of claim 1, further comprising generating the labeled data and the unlabeled data via:
- at least one of distant supervision using question-answer pairs and existing knowledge bases; and
- full supervision with manually annotated data.

5. The method of claim 1, wherein training the multi-layered neural network comprises using the labeled data with the multi-layered neural network to force the output of the multi-layered neural network to match corresponding labels of the labeled data.

6. The method of claim 1, wherein training the multi-layered neural network comprises using the unlabeled data with the multi-layered neural network to minimize data reconstruction errors.

7. The method of claim 1, wherein the extracting concepts determined to have passage justification includes using outputs from any selected one of the layers of the multi-layered neural network as concepts for input to a higher layer of the multi-layered neural network.

8. The method of claim 1, wherein the multi-layered neural network includes at least one of a convolutional neural network and a deep neural network.

9. The method of claim 1, wherein the multi-layered neural network includes a combination of stacked neural networks.

* * * * *